Figure 1:
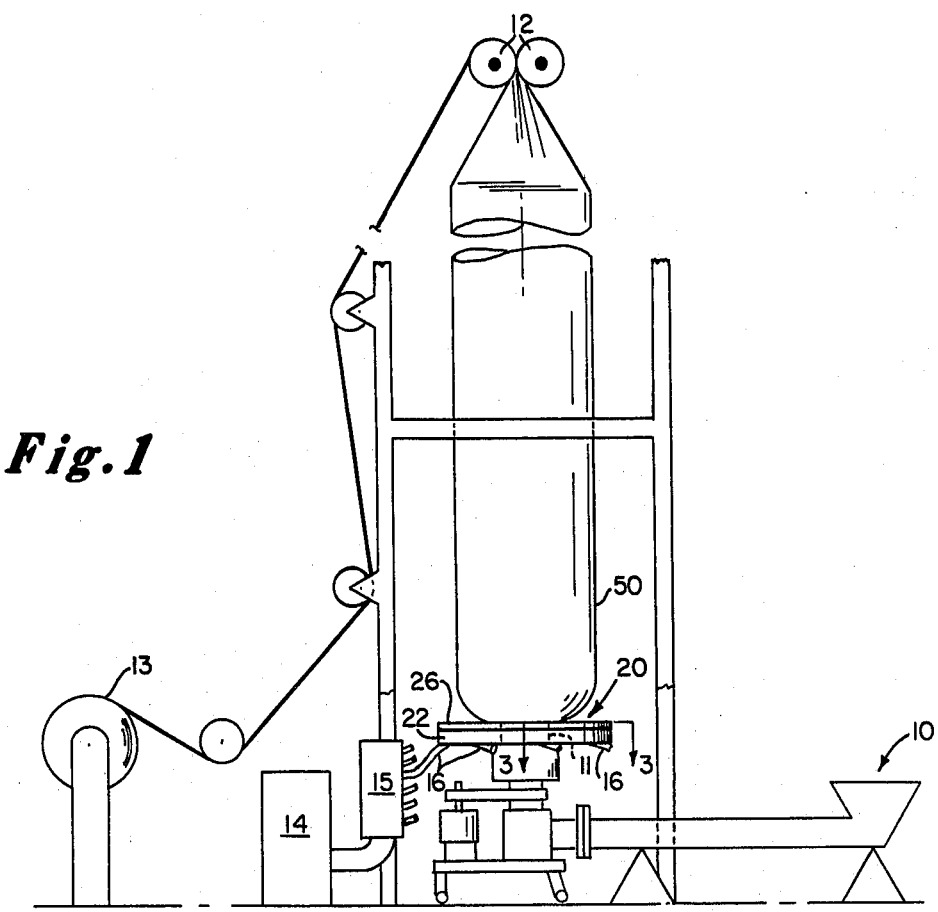

United States Patent [19]

Church

[11] 4,373,273
[45] Feb. 15, 1983

[54] AIR RING HAVING A CIRCULAR ARRAY OF A LARGE MULTIPLICITY OF SUBSTANTIALLY PARALLEL CELL-LIKE PASSAGES IN THE AIR FLOW PATH LEADING TO THE OUTLET

[75] Inventor: Robert Church, Bartlett, N.H.

[73] Assignee: Gloucester Engineering Co., Inc., Gloucester, Mass.

[21] Appl. No.: 253,549

[22] Filed: Apr. 13, 1981

[51] Int. Cl.³ .................... F26B 19/00; B29D 7/20
[52] U.S. Cl. .................................... 34/104; 34/20; 34/106; 264/569; 425/72 R; 425/326.1
[58] Field of Search .................. 34/20, 104, 105, 106, 34/107; 425/72 R, 326.1; 264/569

[56] References Cited

U.S. PATENT DOCUMENTS

| | | | |
|---|---|---|---|
| 2,926,384 | 3/1960 | Hertz et al. | 425/72 |
| 2,952,874 | 9/1960 | Doyle | 425/72 |
| 3,176,347 | 4/1965 | Shaul | 425/72 |
| 3,210,803 | 10/1965 | Najar | 425/72 |

*Primary Examiner*—Larry I. Schwartz

[57] ABSTRACT

An air ring of the type mounted concentrically with a moving tube of plastic at a point close to where the plastic emerges from an annular die to receive, guide and discharge air in a desired direction to expose cooling air to the surface of the tube, the air ring having a circular array of a multiplicity of substantially parallel, cell-like passages, each passage having orthogonal lateral dimensions (X and Y directions) transverse to the local direction of flow (Z direction) that are less than one-half of the flow length, and divide the flow path to the outlet into a multiplicity of individual cell-like flow paths, the aggregate flow area presented by the passages being at least 80% of the inlet surface of the array. The array of passages and cooperating surfaces of the air ring are adapted to deliver a general nonhomogeneous flow to the array, to momentarily divide the flow into discrete, parallel, oriented streams which remerge into a second general, radially directed flow toward the surface of the tube, the multiplicity of streams being effective to orient air flow and to remove major turbulences and vortices in both orthogonal directions with relatively little pressure drop occuring across the array.

7 Claims, 14 Drawing Figures

AIR RING HAVING A CIRCULAR ARRAY OF A LARGE MULTIPLICITY OF SUBSTANTIALLY PARALLEL CELL-LIKE PASSAGES IN THE AIR FLOW PATH LEADING TO THE OUTLET

FIELD OF THE INVENTION

This invention relates to air distributing rings for cooling blown-film, devices sometimes referred to as "air rings".

BACKGROUND OF THE INVENTION

In the production of blown film, it is desirable to provide a uniform flow of cooling air to the film bubble as it emerges from the extruder die. Typically the film bubble travels vertically upward from the die and the ring is axially aligned with the bubble. In the case of external air rings, the air ring is horizontal, of annular form and surrounds the bubble.

Nonuniformity in the flow from air rings tends to cause undesirable nonuniformities in the film. Cooling air is generally supplied through discrete conduits to the air ring and the degree of uniformity of the film that can be obtained depends upon the degree to which the nonuniform pattern of the cooling air flow produced by the discrete conduits has been eliminated by the air ring.

For external air rings it is common for the conduits to introduce air in a tangential flow direction into an annular plenum of the air ring to produce a swirling flow, and then this air is directed to proceed inwardly toward the bubble through a flow-evening path.

It is also known to guide the major stream of cooling air in a generally axial direction along the surface of the film bubble and to direct a minor air stream against the film, at a point adjacent to the extruder die, prior to the major stream, with the minor stream flowing between the film and the major stream guide lip.

Some of the known apparatus have required wasteful amounts of energy to operate because of their high flow resistance. Further, their characteristic high flow resistance and high air velocities make the designs sensitive to small circumferential differences in flow path dimensions, as such differences produce circumferential nonuniformities of flow which become accentuated at high velocities. In one distributing ring, for example, a flow-evening path in the cooling stream includes narrow slots which are spaced circumferentially about the ring. The narrow slots offer relatively high flow resistance.

In todays's industry there is a desire to operate the film extrusion line at greater speeds than heretofore. Such speeds place increased demands upon the flow capacity of the air cooling equipment. As flow velocities and flow rates are increased, previously acceptable air-distributing ring designs, in scale-up of size, increasingly show their deficiencies. They tend to produce nonuniform air distribution patterns, they require larger and noisy blowers, and they tend to be cumbersome in size and expensive to manufacture.

To overcome these problems, thin, radial fin elements have been employed, located with their leading edges in a concentric circle to receive air from the plenum. These fin elements serve to direct the inner portion of the swirling air mass in the plenum radially toward the outlet at the film bubble. Such fin arrangements, however, are expensive and may not fully alleviate turbulence.

It is an object of the present invention to provide a relatively inexpensive air ring construction which overcomes these problems to deliver the volume of cooling air uniformly to the film bubble.

SUMMARY OF THE INVENTION

The invention is an air ring of the type mounted concentrically with a moving extruded tube of plastic at a point close to where the plastic emerges from an annular die, the air ring having at least one inlet for cooling air and means to guide the air toward the surface of the tube. The air ring has at least one outlet adjacent the surface of the tube for discharging air in a desired direction for exposure of the cooling air to the tube surface, and at least one internal device for modifying the air flow to make the flow more uniform before it reaches the outlet.

According to the invention the internal device is comprised of a circular array of a large multiplicity of substantially parallel cell-like passages in the air flow path leading to the outlet. The individual, cell-like passages have orthogonal, lateral dimensions (X and Y directions) transverse to the local direction of flow (Z direction) that are less than about one-half the flow length (Z dimension) of the passages, and divide the air flow path leading to the outlet into a multiplicity of individual cell-like flow paths, and the aggregate cross-sectional flow area presented by the array of cell-like passages comprises at least 80% of the inlet surface of the internal device. This array of cell-like passages and cooperating surfaces of the air ring are adapted to deliver a general, nonhomogeneous flow to the array, divide the general flow by the array momentarily into a multiplicity of discrete, parallel, oriented, small streams separated from each other in both the X and Y coordinates and cause the streams to subsequently merge into a second general, radially directed flow toward the surface of the plastic tube. The multiplicity of streams is effective to orient the direction of flow of the air and remove major turbulences and vortices in both X and Y coordinates with relatively little pressure drop occuring across the internal device.

In preferred embodiments, at least one of the circular arrays of cell-like passages is adapted to receive air flow having a circumferential component and to remove at least a portion of the circumferential component thereby delivering the air flow in a direction substantially radial to the outlet, preferably, the air ring is constructed for applying cooling air to the exterior surface of an extruding tube, the ring having a circular entry plenum fed by a multiplicity of inlet conduits spaced around the periphery of the plenum, the internal device positioned to eliminate a circumferential component of velocity of the air attributable to swirling flow in the plenum; the internal device is comprised of expanded honeycomb of linear form deformed into a circular annulus of desired circumference, or it may be comprised of alternating layers of corrugated sheets and flat sheets, or it may be comprised of expanded honeycomb created from stacked annular disks; at least one circular array of cell-like passages discharges radially into the passage leading to the outlet, the circular array located closer to the outlet then to the plenum; the orthogonal lateral dimensions transverse to the local direction of flow of each said individual cell-like passage in the circular array at the inner annular surface and at the outer annular surface of said internal device are different, the dimension at said outer annular surface in the annular direction (Y dimension) being greater than the Y dimension at the inner annular surface, and the dimension at the outer annular surface in the axial direction (X dimension) is less than the X dimension at the inner annular surface of the internal device; the air ring has at least two outlets adjacent the tube for discharging air, one of the outlets having a substantially smaller flow capacity, an internal device for modifying air flow located in the air passage leading to this outlet, the internal device comprised of a sheet having an array of hollows and ridges that extend in the local direction of flow, the hollow and ridges of height equal to that of the respective air passage, the sheet disposed between a pair of passage defining surfaces; and the orthogonal lateral dimensions (X and Y directions) of the cell-like passages transverse to the local direction of flow (Z direction) are of substantially the same size.

These and other features of the invention will be understood from the following description of a preferred embodiment.

PREFERRED EMBODIMENT

The structure and operation of a preferred embodiment of the invention will now be described, after first briefly describing the drawings.

DRAWINGS

Figure 2:
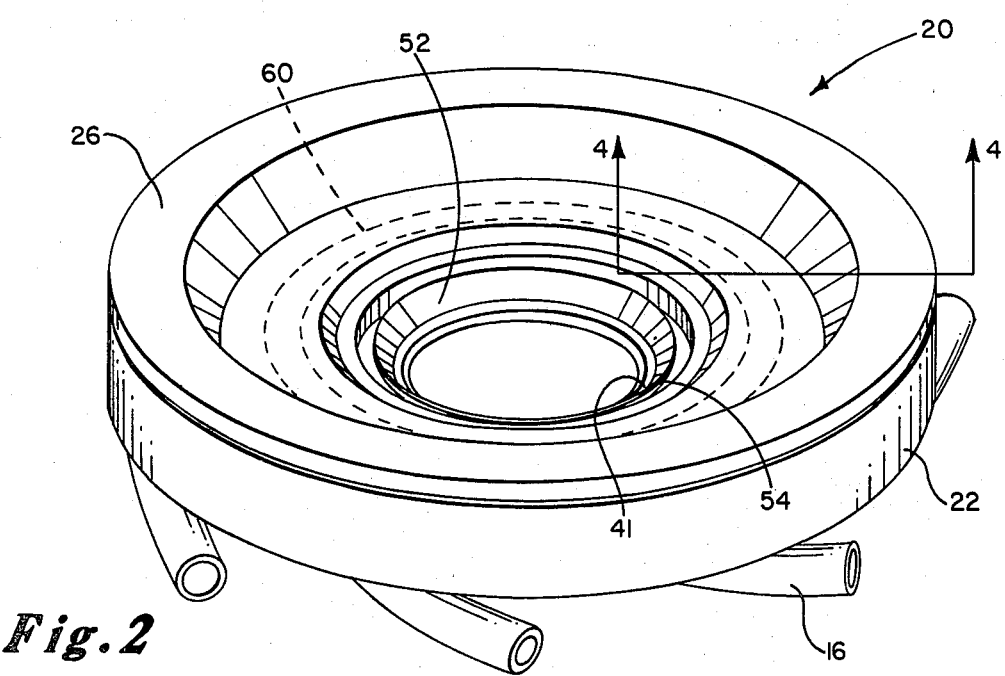
Figure 1A:
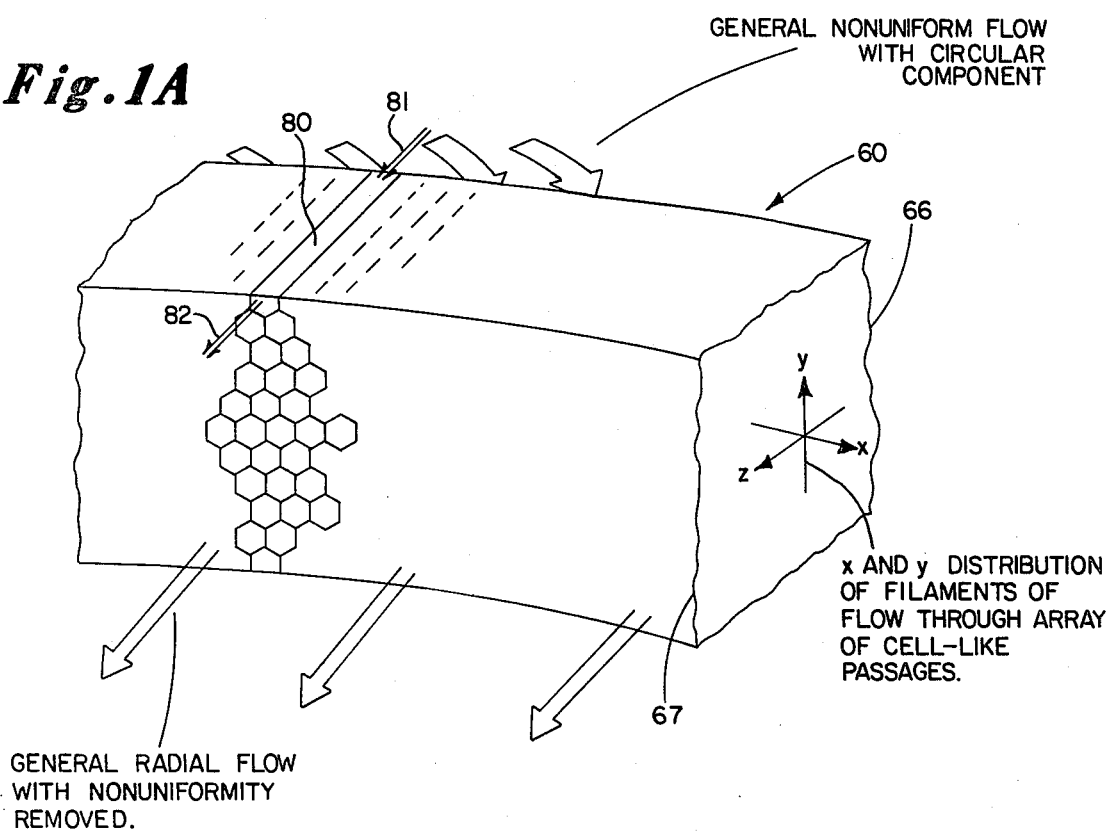
Figure 10:
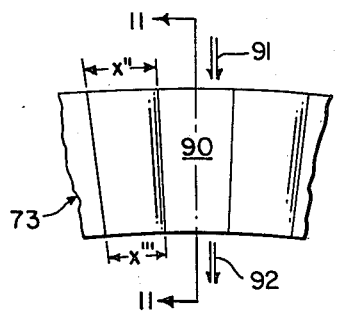
Figure 11:
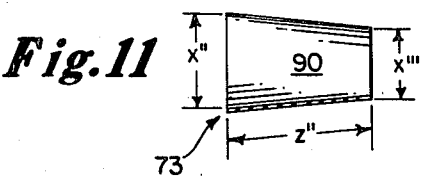
Figure 12:
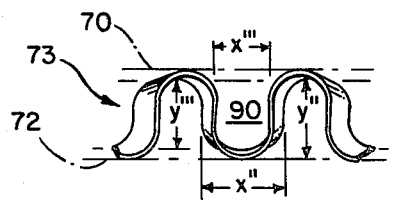
Figure 13:
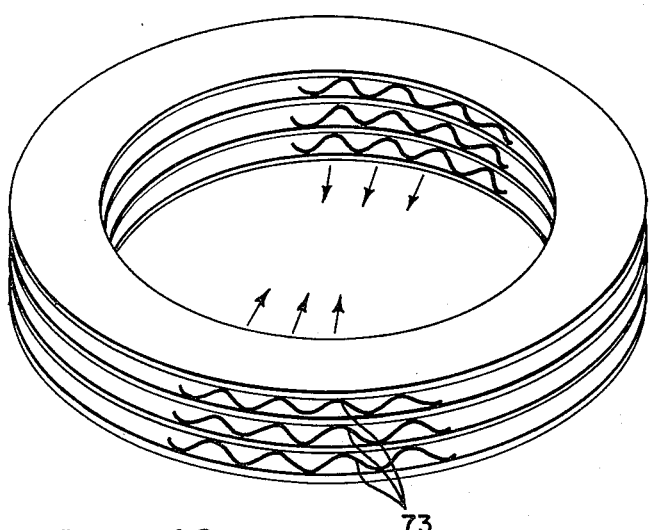
Figure 3:
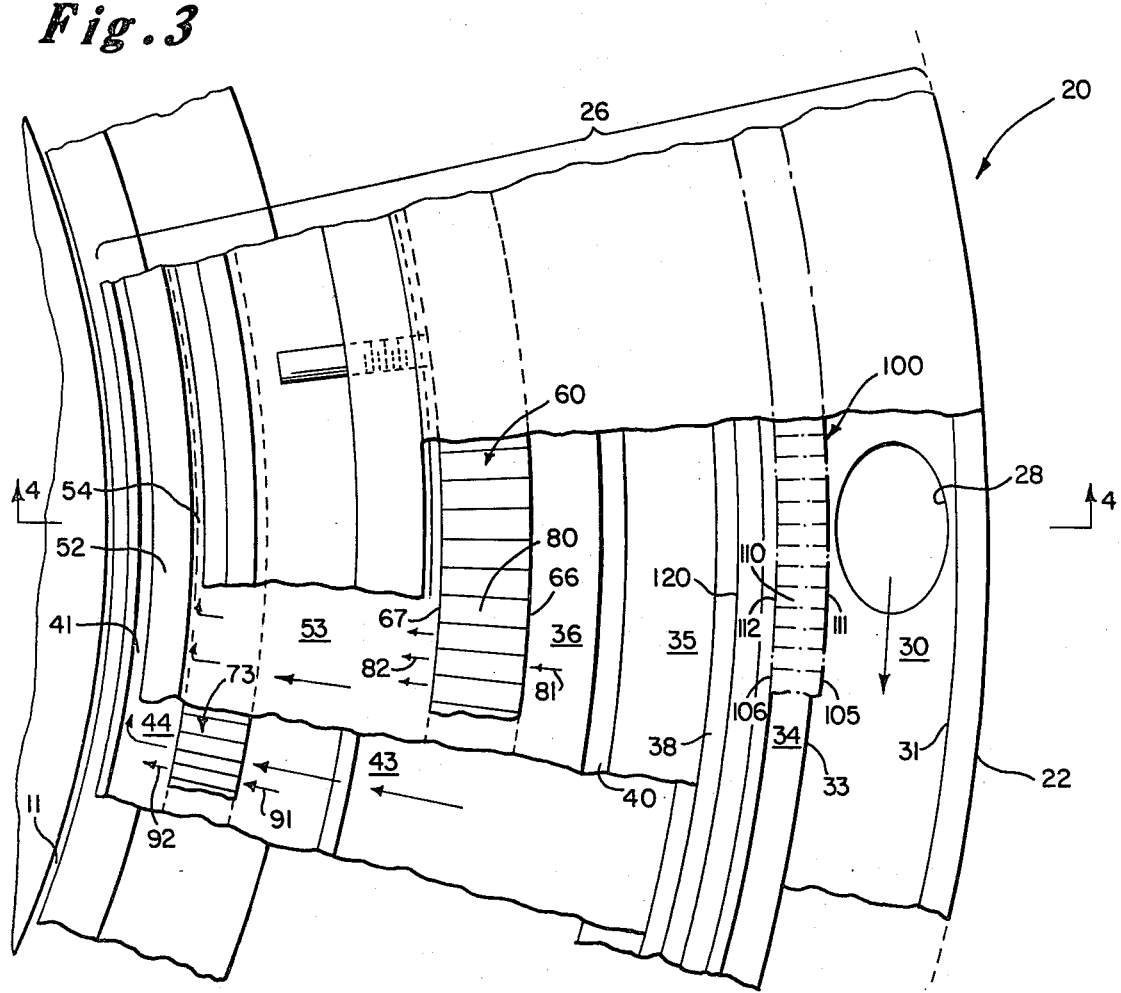
Figure 4:
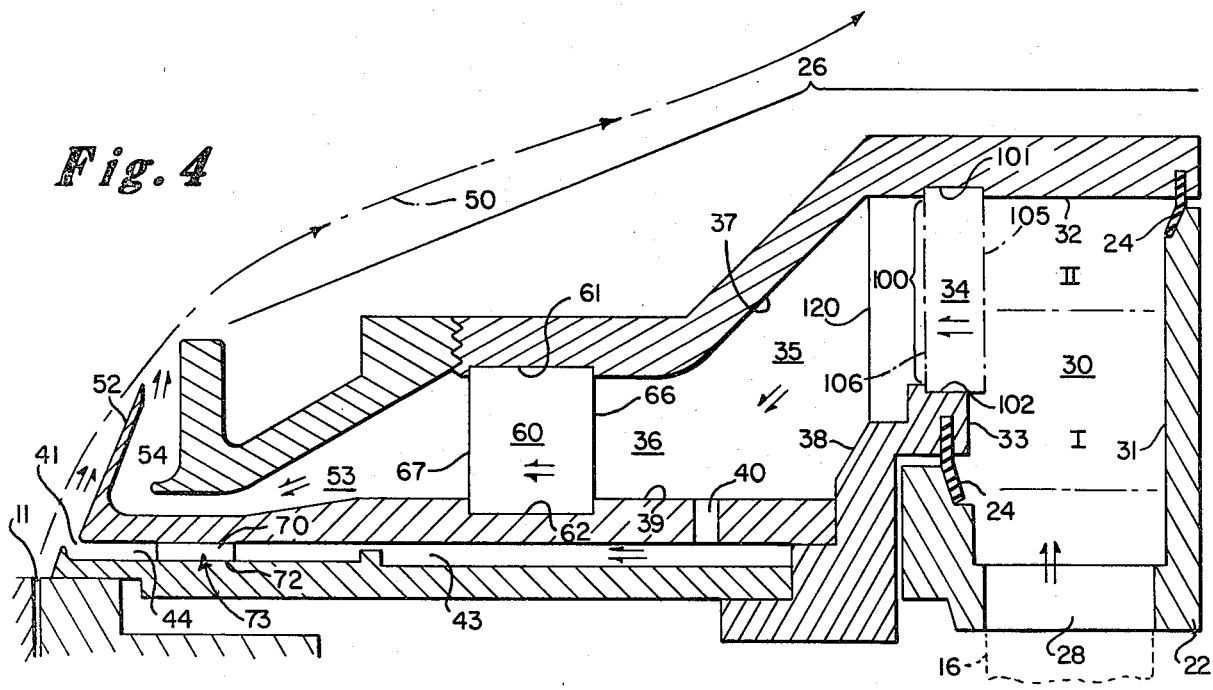
Figure 5:
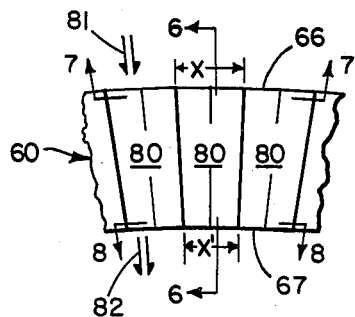
Figure 6:
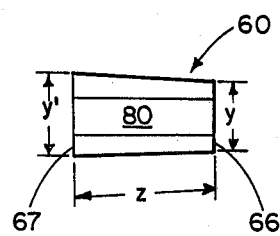
Figure 7:
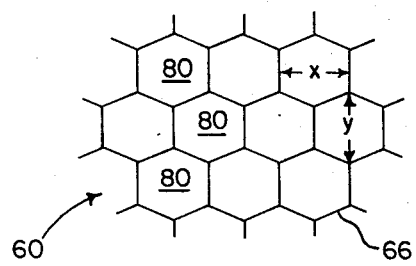
Figure 8:
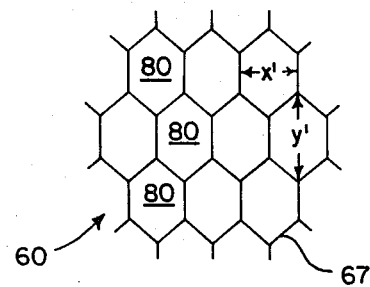
Figure 9:
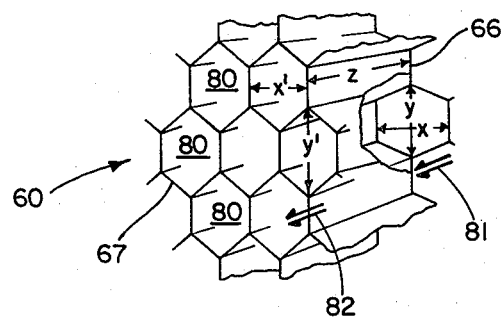

FIG. 1 is an elevation view of a blown film and overhead take up apparatus with an air distribution ring employing the invention, FIG. 1a is a perspective view of the preferred embodiment of the invention showing the representative components of air flow, FIG. 2 is a perspective view of an air distribution ring, FIG. 3 is a top plan view partially in section of an air distribution ring at the line 3—3 of FIG. 1, FIG. 4 is a side section view of an air distribution ring at the line 4—4 of FIG. 2, FIG. 5 is a top plan view partially in section of the preferred embodiment at the line 5—5 of FIG. 4, FIG. 6 is a top section view of a single passage at the line 6—6 of FIG. 5, FIG. 7 is a face plan view of the outer annular surface of the internal device at the line 7—7 of FIG. 5, FIG. 8 is a face plan view of the inner annular surface of the internal device at the line 8—8 of FIG. 5, FIG. 9 is a perspective view partially cut away of the inner annular surface of the internal device of the preferred embodiment, FIG. 10 is a top plan view partially in section of the internal device in the passage having substantially smaller flow capacity at the line 10—10 of FIG. 4, FIG. 11 is a top section view of a single passage at the line 11—11 of FIG. 10, FIG. 12 is a perspective view of the inner annular face of the internal device in the air passage having substantially smaller flow capacity, FIG. 13 is a perspective view of another embodiment of the invention.

STRUCTURE

Referring to FIG. 1, there is shown apparatus for producing blown film, such as for plastic bags. Plastic resin is fed into hopper 10, melted internally and extruded from annular die 11, here 30 inches in diameter, and pulled vertically upward by take-up rollers 12. From there the film passes over rollers 12 and is wound on storage roll 13. Molten plastic leaves die 11 with a thickness much greater than the finished film thickness, but is quickly drawn down to one or a few mils thickness by the difference in speed between take-up rollers 12 and the extrusion speed as die 11 as well as by transverse expansion (i.e. "flow up") in response to the internal air pressure. The die rotates for the purpose of distributing any residual nonuniformities in the film across the width of the storage roll 13.

To cool the extruded film as it leaves die 11, air is supplied to the bubble exterior, as illustrated by the arrows in FIG. 4. Air is supplied by blower 14 through manifold 15 and hoses 16 to air distributing ring 20, nominally a 36 inch air ring, which surrounds the emerging bubble.

Referring to FIGS. 3 and 4, air distributing ring 20 includes a stationary annular lower element 22 to which hoses 16 are tangentially connected. Above the stationary lower element 22 and sealed to it by seals 24, is a rotating assembly 26. Inlets 28 for air incoming from hoses 16 are located in the bottom of stationary element 22.

An annular plenum 30 is defined by wall elements 31, 32, 33 of distributing ring 20. Annular passage 34, remote from inlet 28 at the top of inside wall 33, communicates inwardly with annular space 35 defined by top plate 37 and bottom plate 38, 39. Annular passage 40 located in base plate 39 carries a lesser air stream through outer 43 and inner 44 annular passages to outlet 41 adjacent to extruder die 11 to be directed between film bubble 50 and cooling stream guide 52. Annular passage 36 carries cooling air through cooling passage 53 to cooling outlet 54 to be directed vertically along film bubble 50 by cooling air guide 52.

Located in annular passage 34 is spacer 120, of perforated metal, which modifies, to a limited extent, the turbulent circumferential flow moving from plenum 30 through annular passage 34 and into annular space 35.

Located in the main cooling passage 53 closer to cooling outlet 54 than annular passage 34 is circular member 60 comprised of a multiplicity of uniform, cell-like passages transverse to the local direction of flow. Member 60 extends from top plate 61 to bottom plate 62 and is concentric to annular passage 34 and cooling outlet 54. Member 60 is comprised of an array of cell-like passages (FIGS. 5, 6, 7 and 9) of generally uniform orthogonal transverse dimensions (X, Y), typically 3/16 inch, at the outer annular surface 66; the dimensions at the inner annular surface 67 (FIGS. 5, 6, 8 and 9) are higher ($Y^1$) and narrower ($X^1$). The path length (Z) is at least twice as long, typically 1.5 inches, as either dimension transverse to the flow axis. Formation of member 60 is achieved by rolling a section of commercial, linear honeycomb, i.e. of the type having substantially parallel flow paths through the cells, e.g. as supplied by Hexcel Structural Products of Bel Air, Maryland, typically 1¾ inch by 1½ inch with walls 0.003 inches thick, of the desired length, approximately 137 inches, to a circular configuration wherein the flow paths through the cells become radial to the outlet.

Located in lesser passage 43, 44 closer to outlet 41 than to annular passage 34 is circular member 70. Member 70 (FIGS. 11 and 12) is created by corrugating a linear strip of material, typically 110 inches long by 1 inch wide by 0.005 inch thick, between interlocking, multitoothed gears to create annular piece 73 with uniform ridges and hollows of height, typically 3/16 inch, equal to the distance between upper plate 62 and lower plate 72 of the annular passage. The air flow length (Z")

of circular member 70 is at least twice the greater of the orthogonal dimensions (X", Y"), and the inlet width (X") is greater than the outlet width (X''').

OPERATION

Pressurized air from blower 14 enters plenum 30 through inlets 28 from hoses 16 which are inclined to the horizontal at 20 degrees. The flow bends so as to be substantially horizontal as it enters, and forms a swirling mass within plenum 30. As the swirling air progresses from Level I at the bottom of the plenum to Level II at the upper level, interaction of the swirling air with the confining walls breaks up localized regions of vorticity and other nonuniformities and produces at the top of the plenum a swirling torus of air.

The swirling torus of air migrates through annular passage 34 and into annular space 35. Spacer 120 acts to modify the major turbulences in the air flow to a limited extent, but the major flow extending about annular passage 36 and the minor portion extending into annular passage 40 are turbulent in character with major circumferential components.

The openings 81 (FIGS. 6 and 9) of cells 80 at the outer annular surface 66 of circular honeycomb 60 intercept inner peripheral elements of the turbulent, circumferentially moving mass of air. The flow direction of each discrete stream is oriented along the flow axis of passage 80, and the movement through the passage momentarily separated into discrete, parallel, oriented, smaller streams by the walls of the passage removes the turbulence, and all components of circumferential flow from the stream. As the stream emerges from outlet 82 of passage 80 into cooling annular passage 53, it subsequently merges with other streams to be oriented into a second, general, radially directed, uniform, i.e. laminar, flow to cooling outlet 54. Each component stream of the total flow maintains its position relative to component streams emerging from adjacent passages. The cooling flow is directed inward in annular cooling passage 53 and upward by guide 52 to cool film bubble 50.

The inner peripheral elements of moving, turbulent air in outer passage 43 are intercepted by opening 91 (FIG. 10) of a single layer of cell passages 70 in passage 43, 44. The flow direction of each discrete stream is oriented along the axis of flow through passage 90 and movement through the passage momentarily separated into discrete, parallel, oriented, small streams by the walls of the passage removes vortices and major turbulence. As the stream emerges from outlet 92 of cell passage 90 into inner passage 44, it merges with the adjacent streams oriented into a single uniform, i.e. laminar, flow radial to outlet 41. Each component stream of the total flow maintains its position relative to component streams from adjacent passages. The flow is directed from outlet 41 between guide 52 and film bubble 50 to keep bubble 50 from sticking to guide 52.

OTHER EMBODIMENTS

Other embodiments of the invention are within the following claims. For example, as shown by the dashed lines in FIGS. 3 and 4, circular member 100, comprised of a multiplicity of uniform, cell-like passages, may be located in annular passage 34. Member 100 may be used in addition to spacer 120, or without it. The member extends from top plate 101 to bottom plate 102 and is concentric to annular passage 34 and cooling outlets 41 and 54, and is comprised of cells of generally uniform orthogonal lateral dimensions, typically 3/16 inch, at the outer annular surface 105; the dimensions at the inner annular surface 106 are higher and narrower. The path length is at least twice as long, typically ¾ inch, as either dimension transverse to the flow axis. Formation of member 100 is achieved by applying the same means employed to form member 60 (discussed earlier) to a section of linear honeycomb 2.5 inches high by 0.75 inches wide by 168 inches long.

In operation, the openings 111 of cell 110 at the outer annular surface 105 of circular honeycomb 100 intercept inner peripheral elements of the swirling, turbulent torus of air in plenum 30. The flow direction of each discrete stream is oriented along the flow axis of passage 110, and movement through the passage momentarily separated into discrete, parallel, oriented, small streams by the walls of the passage removes some turbulence. As the stream emerges from opening 112 of passage 110 at the inner annular surface 106 into annular space 35, it subsequently merges with other streams oriented into a single, uniform flow radial to annular passage 36. Pressure variations and remaining minor turbulence in the air stream within annular space 35 reintroduce some circumferential movement and turbulence into the air flow as it approaches annular space 36, where circular member 60 intercepts the swirling, turbulent air mass.

Also, circular members 60 and 100 may be formed from stacked annular rings of the desired circumference by the same means employed to manufacture sections of linear honeycomb, i.e. welding the flat sheets, in this case, washer-like rings, together at radial intervals and expanding the unit into a honeycomb configuration. The may also be formed by interleafing corrugated members shown in this invention for the circular member in the lesser passage with flat disks (FIG. 13) in sufficient layers to occupy the space between top and bottom plates at their respective positions.

An I.B.C. air ring, i.e. an air ring for Internal Bubble Cooling, may also be constructed employing the cell-like array flow evening device of the invention to direct flow and remove major turbulences and vortices in the internal cooling air stream.

What is claimed is:

1. In an air ring of the type mounted concentrically about a moving extruded tube of plastic at a point close to where the plastic emerges from an annular die, the air ring having a circular entry plenum fed by generally tangential inlet conduit means and means to guide the air inwardly toward the surface of the tube, the flow of air in said plenum having a circumferential component of velocity attributable to the swirling flow in said plenum, said air ring having at least one outlet adjacent the surface of the tube for discharging air in a desired direction for exposure of the cooling air to the tube surface, and the air ring having at least one internal device lying inwardly of said plenum for modifying the air flow to make the flow more uniform before it reaches said outlet, the improvement wherein said internal device comprises a circular array of a large multiplicity of substantially parallel, generally radial, convergently arranged, centrally directed, cell-like passages in the air flow path leading inwardly to said outlet, the individual cell-like passages having orthogonal lateral dimensions (X and Y directions) transverse to the local radial direction of flow (Z direction) less than about one-half the air flow length (Z dimension) of said passages, and being adapted to divide said air flow path leading to said outlet into a multiplicity of individual cell-like flow paths, the aggregate cross-sectional flow area presented by said array of cell-like passages comprising at least 80% of the inlet surface of said internal device, said air ring adapted to deliver a general air flow to said array containing a circumferential component of motion, and said array adapted to receive said general flow of air and to divide said flow momentarily into a multiplicity of discrete, parallel, radially oriented, centrally directed small streams separated from each other in both X and Y coordinates, and to cause said streams to subsequently merge into a second generally radial, convergently directed flow toward the surface of said plastic tube, the momentary division of said general flow by said array into said multiplicity of streams being effective to eliminate said circumferential component of velocity in said air flow and to orient the direction of flow of said air and remove major turbulences and vortices in both X and Y coordinates with relatively little pressure drop occurring across said internal device.

2. The air ring of claim 1 wherein said internal device is comprised of expanded honeycomb in linear form, deformed into a circular annulus of desired circumference.

3. The air ring of claim 1 wherein said internal device is comprised of expanded honeycomb created from stacked annular disks.

4. The external air ring of claim 1 wherein at least one said circular array of cell-like passages discharges substantially radially into the passage leading to said outlet, said circular array located in said passage closer to said outlet than to said plenum.

5. The air ring of claim 1 wherein the orthogonal lateral dimensions transverse to the local direction of flow of each said individual cell-like passage in the circular array at the inner annular surface and at the outer annular surface of said internal device are different, the dimension at said outer annular surface in the annular direction (Y dimension) being greater than the Y dimension at the inner annular surface, and the dimension at said outer annular surface in the axial direction (X dimension) being less than the X dimension at the inner annular surface of said internal device.

6. The air ring of claim 1, said air ring having at least two outlets adjacent said tube for discharging air, wherein one said outlet has a substantially smaller flow capacity, an internal device for modifying air flow located in the air passage leading to the one said outlet, said internal device comprised of a sheet having an array of hollows and ridges that extend in the local direction of flow, said hollows and ridges of height equal to that of the respective air passage, said sheet disposed between a pair of passage defining surfaces.

7. The air ring of any of the preceding claims wherein the orthogonal lateral dimensions (X and Y directions) of said cell-like passages transverse to the local direction of flow (Z direction) are of substantially the same size.

* * * * *

UNITED STATES PATENT AND TRADEMARK OFFICE
CERTIFICATE OF CORRECTION

PATENT NO. : 4,373,273

DATED : February 15, 1983

INVENTOR(S) : Robert Church

It is certified that error appears in the above-identified patent and that said Letters Patent is hereby corrected as shown below:

The following citations have been omitted from the printed patent:

HEXCEL Honeycomb, Hexcel Corporation (1730)

HEXCEL, WINTER 1979 REVISION, Hexcel Corporation (1979)

Column 4, line 4, "as die 11" should be --at die 11--;

Column 4, line 5, "flow up" should be --"blow up"--;

Column 6, line 32, "The may" should be --They may--.

Signed and Sealed this

Twenty-sixth Day of July 1983.

[SEAL]

Attest:

GERALD J. MOSSINGHOFF

Attesting Officer

Commissioner of Patents and Trademarks